United States Patent
Shimizu et al.

(10) Patent No.: US 9,812,675 B2
(45) Date of Patent: Nov. 7, 2017

(54) BATTERY AND PRODUCTION METHOD THEREOF

(71) Applicant: Kabushiki Kaisha Toshiba, Minato-ku (JP)

(72) Inventors: Toshifumi Shimizu, Saku (JP); Kengo Kurata, Saku (JP); Natsuki Toyota, Kashiwazaki (JP); Eiki Kashiwazaki, Annaka (JP)

(73) Assignee: KABUSHIKI KAISHA TOSHIBA, Minato-ku (JP)

(*) Notice: Subject to any disclaimer, the term of this patent is extended or adjusted under 35 U.S.C. 154(b) by 133 days.

(21) Appl. No.: 14/313,681

(22) Filed: Jun. 24, 2014

(65) Prior Publication Data

US 2014/0308549 A1   Oct. 16, 2014

Related U.S. Application Data

(60) Division of application No. 13/588,121, filed on Aug. 17, 2012, now Pat. No. 9,023,501, which is a (Continued)

(30) Foreign Application Priority Data

Feb. 17, 2010   (JP) .................................. 2010-032952
Mar. 15, 2010   (JP) .................................. 2010-058181

(51) Int. Cl.
*H01M 2/22*   (2006.01)
*H01M 2/26*   (2006.01)
(Continued)

(52) U.S. Cl.
CPC ............. *H01M 2/024* (2013.01); *B23K 26/00* (2013.01); *B23K 26/20* (2013.01);
(Continued)

(58) Field of Classification Search
None
See application file for complete search history.

(56) References Cited

U.S. PATENT DOCUMENTS 6,703,158 B1* 3/2004 Hirano ................ H01M 2/0408
                                                        429/133
8,268,478 B2* 9/2012 Kim .................... H01M 2/1022
                                                        429/186
(Continued)

FOREIGN PATENT DOCUMENTS

CN         1934729        3/2007
JP         09-007557      1/1997
(Continued)

OTHER PUBLICATIONS

Extended European Search Report issued Oct. 21, 2015 in Patent Application No. 11744654.2.
(Continued)

*Primary Examiner* — Jonathan Crepeau
(74) *Attorney, Agent, or Firm* — Oblon, McClelland, Maier & Neustadt, L.L.P.

(57) ABSTRACT

According to one embodiment, there is provided a battery having a plurality of current collector tabs extended from a plurality of points of a current collector of at least one electrode of a positive electrode and a negative electrode. The battery further has a lid and a lead. The lead has a current collector tab junctional part connected with the current collector tabs, a lid junctional part fixed to the lid, and a vibration absorber part linking the current collector tab junctional part to the lid junctional part.

4 Claims, 12 Drawing Sheets

Related U.S. Application Data continuation of application No. PCT/JP2011/053244, filed on Feb. 16, 2011.

(51) Int. Cl.
  *H01M 2/02* (2006.01)
  *H01M 2/04* (2006.01)
  *B23K 26/20* (2014.01)
  *B23K 26/00* (2014.01)
  *H01M 2/12* (2006.01)

(52) U.S. Cl.
  CPC .......... *H01M 2/0426* (2013.01); *H01M 2/22* (2013.01); *H01M 2/26* (2013.01); *H01M 2/263* (2013.01); *H01M 2/12* (2013.01); *Y10T 29/4911* (2015.01)

(56) References Cited

U.S. PATENT DOCUMENTS

| | | | |
|---|---|---|---|
| 2004/0048147 A1* | 3/2004 | Muraoka | H01M 4/74 429/94 |
| 2007/0105015 A1 | 5/2007 | Munenaga et al. | |
| 2007/0117009 A1 | 5/2007 | Yamauchi et al. | |
| 2008/0026293 A1 | 1/2008 | Marple et al. | |
| 2009/0017376 A1 | 1/2009 | Yamamura et al. | |
| 2011/0151295 A1 | 6/2011 | Kim | |
| 2011/0183165 A1 | 7/2011 | Byun et al. | |
| 2011/0287291 A1 | 11/2011 | Byun et al. | |

FOREIGN PATENT DOCUMENTS

| | | |
|---|---|---|
| JP | 10-144268 | 5/1998 |
| JP | 2000-90891 | 3/2000 |
| JP | 2000-106156 | 4/2000 |
| JP | 2000-156219 | 6/2000 |
| JP | 2002-279944 | 9/2002 |
| JP | 2002-279962 | 9/2002 |
| JP | 2003-346771 | 12/2003 |
| JP | 2006-302736 | 11/2006 |
| JP | 2007-134156 | 5/2007 |
| JP | 2008-243811 | 10/2008 |
| JP | 2009-26707 | 2/2009 |
| JP | 2009-38004 | 2/2009 |
| TW | 425732 | 3/2001 |
| TW | 432736 | 5/2001 |
| TW | 461132 | 10/2001 |
| TW | 200527733 | 8/2005 |
| TW | M285804 | 1/2006 |
| WO | WO99/25036 | 5/1999 |

OTHER PUBLICATIONS

Office Action issued on Jun. 17, 2015 in Chinese Patent Application No. 201180009874.8 with English translation.
Supplementary Partial Search Report dated May 29, 2015 in European Patent Application No. 11744654.2.
Machine Translation of JP 2008-243811, dated Oct. 2008.
International Search Report dated May 17, 2011 in PCT/JP2011/053244 filed Feb. 16, 2011 (with English Translation).
Combined Office Action and Search Report dated Aug. 27, 2013 in Taiwanese Application No. 100105098 (with English Translation).
Office Action dated Apr. 1, 2014 in Japanese Application No. 2010-032952 filed Feb. 17, 2010 (w/English Translation).
Office Action dated Apr. 1, 2014 in Japanese Application No. 2010-058181 filed Mar. 15, 2010 (w/English Translation).
Office Action dated Apr. 29, 2014 in Chinese Application No. 201180009874.8 (w/English Translation).
Combined Chinese Office Action and Search Report dated Oct. 10, 2016 in Chinese Patent Application No. 201510280328.8 (with English language translation).

* cited by examiner

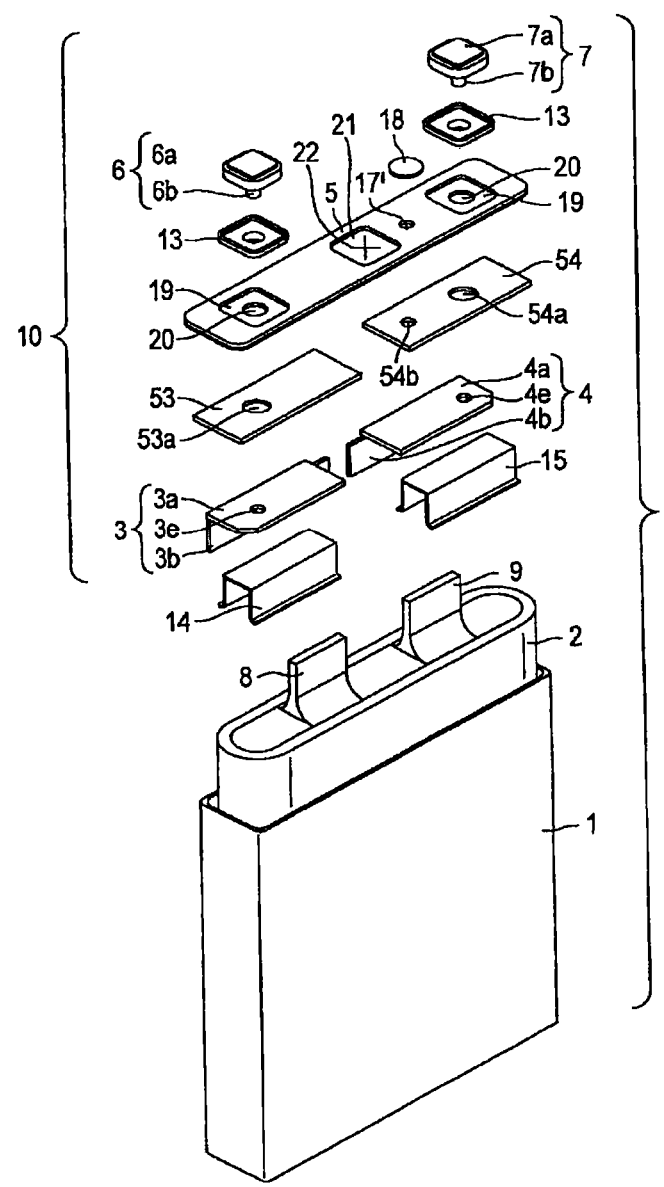
F I G. 1

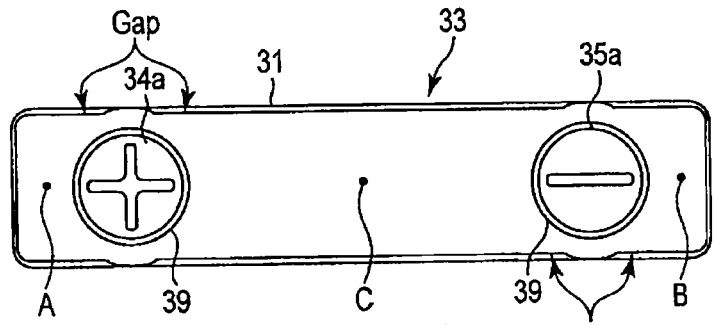
F I G. 17A
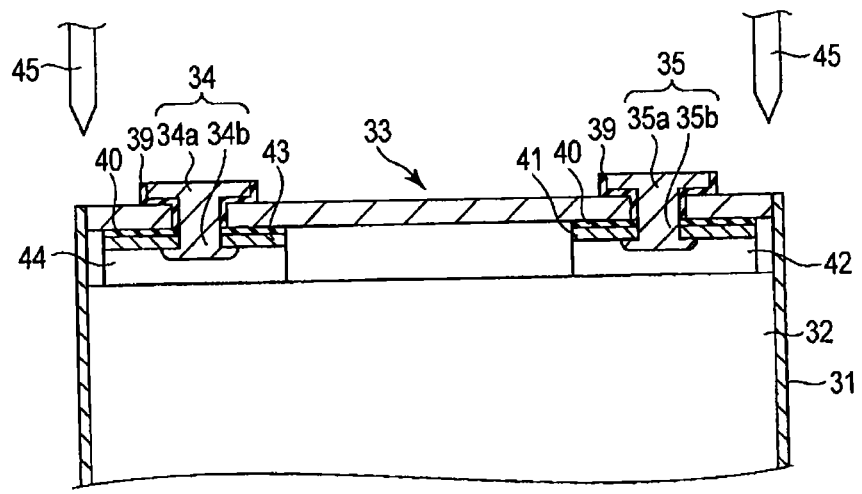
F I G. 17B
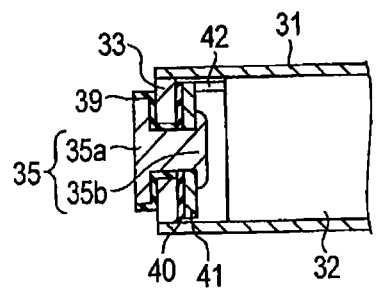
F I G. 17C

BATTERY AND PRODUCTION METHOD THEREOF

CROSS REFERENCE TO RELATED APPLICATIONS

This application is a Divisional application of U.S. application Ser. No. 13/588,121, filed Aug. 17, 2012 which is a Continuation application of PCT Application No. PCT/JP2011/053244, filed Feb. 16, 2011 and based upon and claiming the benefit of priority from Japanese Patent Applications No. 2010-032952, filed Feb. 17, 2010; and No. 2010-058181, filed Mar. 15, 2010, the entire contents of all of which are incorporated herein by reference.

FIELD

Embodiments described herein relate generally to a battery and a production method thereof.

BACKGROUND

Lithium secondary battery has recently been developed as a nonaqueous electrolyte secondary battery which is small and light, has a high energy density, and is capable of repeated discharge and charge, with the development of electronic devices. Lately, it has also been desired to develop a nonaqueous electrolyte secondary battery capable of fast charge and high output discharge, which is suitable as a secondary battery for cars such as a hybrid car and an electric car, or as a secondary battery for electric current storage which is used for electricity equalization.

It is necessary to take out electric current efficiently in order to improve a fast charge performance and a high output discharge performance of a nonaqueous electrolyte secondary battery. For this aim, it is desirable to derive current collector tabs from multiple points of an electrode. These current collection tabs are electrically connected to external terminals equipped on a lid through a lead. The lid further has a safety valve for releasing the pressure.

In one aspect, for example, in a case where a nonaqueous electrolyte secondary battery is loaded in an electric car, when a vibration or impact is applied to the battery from the outside, vibration of an electrode in the battery may be transmitted to a lid through a current collection tab and a lead, whereby a safety valve may be broken. In particular, in a case of a large-sized nonaqueous electrolyte secondary battery for a car, the electrode is also large, which increases the influence of vibration. For this reason, the risk of damage to a safety valve becomes large due the transmission of vibration.

JP-A No. 2002-279962 discloses a positive electrode current collector plate 82 in which an accordion-pressed plate 84 is linked to a fitting hole 91 for fitting a positive electrode terminal through a narrow section 92. The accordion-pressed plate 84 has folded parts 85A, 85B and 85C, and several laminated positive electrodes 87 are inserted into each folded parts. The narrow section 92 forms a current collecting path (see FIG. 13). In the positive electrode current collector 82 in JP-A No. 2002-279962, however, the transmission of vibration of the electrode to a positive electrode terminal cannot be inhibited, because the plate 84 and the fitting hole 91 are located on almost the same plane surface.

JP-A No. 2003-346771 discloses a current collecting connector 2 comprising a body 2a having an almost trapezoidal form and placed horizontally at ends of two power generation elements lined up. The current collecting connector 2 further comprises four electrode connecting parts 2b having long and narrow form and protruding downward from the body 2a. However, a large space is necessary for setting of the current collecting connector 2 in JP-A No. 2003-346771, because the electrode connecting parts 2b reach the lower end of an electrode from the body, and an energy density of a battery is reduced.

In another aspect, a problem occurs in which a welding yield is lowered depending on the method used for fixing a lid to a container. For example, if positions at which lid is fixed are not constant, not only battery sizes but also heights of electrode terminals attached to the lids vary. If the height of the electrode terminal is different from others in the single batteries, welding defects easily occur when an assembled battery is produced by welding the electrode terminals of the single batteries to electrically connect them. As a result, a welding yield is reduced. In addition, when an electrode terminal is fixed to a lid by caulking, the lid may be deformed by the caulking. When the lid is deformed, the degree of fitting between the lid and a case is degraded, and a gap is easily generated between the lid and the case. As a result, a welding yield is reduced in a welded part between the lid and the case.

A method for producing an angular sealed battery of JP-A No. 9-7557 is generally used for an alkali secondary battery such as a nickel-hydrogen secondary battery. According to JP-A No. 9-7557, when a fitted part between an opening end of a container and a lid plate is laser welded to seal the fitted part, a lid plate having a taper peripheral edge is used.

In a sealed battery in JP-A No. 10-144268, an inner peripheral edge of an opening part of a container is formed as a hole side taper, which is opened out, to receive a lid, and an outer periphery of the lid is formed as an axis side taper to fit in the taper of the opening part. Both tapers are formed so that the welding for joining the lid and the container can be performed from a direction toward a top surface of the lid, when the lid is fitted in the opening part of the container. According to JP-A No. 10-144268, the joined part between the lid and the container is welded from a direction toward the top surface of the lid in the state in which the lid is fitted in the opening part of the container.

In JP-A No. 9-7557 and JP-A No. 10-144268, the lids have the taper peripheral edge and do not have flanges. If an electrode terminal is fixed by caulking to the lid having such a shape, a position of the lid in the container easily varies when the lid is deformed by the caulking.

JP-A No. 2000-156219 illustrates, in FIG. 2, a sealed battery using a lid body with a flange. In the battery according to JP-A No. 2000-156219, the electrode terminal is hermetically sealed to the lid body via an insulating material. Thus, the problem of deformation of the lid body caused by the caulking does not occur in the battery according to JP-A No. 2000-156219.

BRIEF DESCRIPTION OF THE DRAWINGS

FIG. 1 is an exploded perspective view of a main part of a battery according to a first embodiment;

FIG. 17A is a top view of the angular battery of Comparative Example 3;

FIG. 17B is a cross-sectional view of the angular battery according to Comparative Example 3, which is cut along a long side direction;

FIG. 17C is a cross-sectional view of the angular battery according to Comparative Example 3, which is cut along a short side direction;

DETAILED DESCRIPTION

Figure 2:
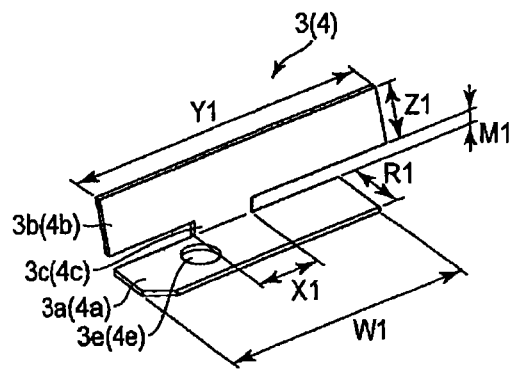
FIG. 2 is a perspective view of a lead used in the battery according to the first embodiment.

In general, according to one embodiment, there is provided a battery comprising a container; an electrode group comprising a positive electrode and a negative electrode and being accommodated in the container; a plurality of current collector tabs extended from a plurality of points of a current collector of at least one electrode of the positive electrode and the negative electrode in the electrode group; a lid closing an opening part of the container; a lead comprising a current collector tab junctional part connected with the current collector tabs electrically, a lid junctional part fixed to the lid, and a vibration absorber part linking the current collector tab junctional part to the lid junctional part; and a safety valve equipped on the lid.

According to another embodiment, there is provided a production method of an angular battery. The battery comprises an angular tube-shaped metal container having a bottom; a positive electrode and a negative electrode accommodated in the container; a lid placed on an opening part of the container; and a terminal fixed to the lid by caulking and connected to the positive electrode or the negative electrode electrically. The lid comprises a bottom placed in the opening part of the container, and a stair part located above the bottom and protruding outward beyond the bottom. The method comprises placing the bottom of the lid in the opening part of the container accommodating the positive electrode and the negative electrode, and placing the stair part of the lid on an upper end of a side wall of the container; and irradiating a laser from a direction vertical to a surface at which the stair part of the lid is overlaid on the upper end of the side wall of the container to weld the stair part of the lid to the upper end of a side wall of the container by laser welding.

Battery in embodiments will be explained below, referring to the drawings. The embodiments are not limited to these embodiments.

(First Embodiment)

FIG. 1 is an exploded perspective view of a sealed angular nonaqueous electrolyte secondary battery. This battery has a container 1, an electrode group 2 accommodated in the container 1, a nonaqueous electrolyte solution (not shown in the drawing) contained in the container 1, a lid 5 closing an opening part of the container 1, a positive electrode terminal 6 and a negative electrode terminal 7 equipped on the lid 5, and a safety valve 21 equipped on the lid 5.

The container 1 is an angular tube-shaped exterior can having a bottom. The container 1 can be formed from, for example, a metal such as aluminum, aluminum alloy, iron or stainless steel.

The electrode group 2 has a flat shape, and contains a positive electrode, a negative electrode, and a separator located between the positive electrode and the negative electrode. The electrode group 2 is produced, for example, by spirally winding a laminate in which the separator is sandwiched between the positive electrode and the negative electrode, and subjecting the resulting product to a pressure molding. The electrode group 2, which has been spirally wound, is fixed with a binding off tape.

The positive electrode has a positive electrode current collector, a positive electrode active material layer, and a positive electrode current collector tab 8. The positive electrode current collector has a belt-like shape. The positive electrode active material layer is formed on at least one surface of the positive electrode current collector. The positive electrode current collector tab 8 has a strip shape which extends from multiple points on long sides of the positive electrode current collector in a short side direction.

The negative electrode has a negative electrode current collector, a negative electrode active material layer, and a negative electrode current collector tab 9. The negative electrode current collector has a belt-like shape. The negative electrode active material layer is formed on at least one surface of the negative electrode current collector. The negative electrode current collector tab 9 has a strip shape which extends from multiple points on long sides of the negative electrode current collector in a short side direction.

The positive and negative electrode current collector tabs 8, 9 may be each formed by punching the current collectors. The current collectors and the current collector tabs are formed from, for example, a metal foil. The thickness of the metal foil, i.e., the thickness of one current collector tab is desirably from 5 µm or more and 50 µm or less. When the thickness is 5 µm or more, breakage of the current collector and the current collector tab during production can be prevented, and high current collection efficiency can be realized. The melting of the current collector tab which occurs when a large electric current flows can also be avoided. When the thickness is 50 µm or less, the number of windings of the laminate can be increased while the increase of the thickness of the electrode group is inhibited. The thickness of the metal foil is preferably 10 µm or more and 20 µm or less. The material of the metal foil is selected depending on the kind of the active material used in the positive electrode and the negative electrode, and for example, aluminum, aluminum alloy, copper or copper alloy may be used.

The multiple positive electrode current collector tabs 8 are sandwiched together by a positive electrode backup lead 14 which is bent in a U-shaped form.

This positive electrode backup lead 14 is also referred to as a "positive electrode protecting lead." Similarly, the negative electrode current collector tabs 9 are sandwiched together by a negative electrode backup lead 15 which is bent in a U-shaped form. The negative electrode backup lead 15 is also referred to as a "negative electrode protecting lead."

The positive electrode backup lead 14 is electrically connected to the positive electrode current collector tab 8, and the negative electrode backup lead 15 is electrically connected to the negative electrode current collector tab 9 by a method such as laser welding, ultrasonic joining or resistance welding, preferably by the ultrasonic joining. The positive and negative electrode backup leads 14 and 15 are desirably formed from the same materials as those of the current collector tabs 8, 9 of the positive and negative electrodes, respectively. The positive and negative electrode backup leads 14 and 15 desirably have a thickness three times or more that of either of one positive electrode current collector tabs 8 or one negative electrode current collector tab 9, respectively. The thickness is more preferably in the range of 0.05 mm or more and 0.6 mm or less, further more preferably 0.1 mm or more and 0.5 mm or less.

An opening part of the container 1 is sealed with an opening-sealing member 10. The opening-sealing member 10 includes the positive electrode terminal 6, the negative electrode terminal 7, gaskets 13, the lid 5, a positive electrode inner insulator 53, a negative electrode inner insulator 54, a positive electrode lead 3 and a negative electrode lead 4. Rectangular depressions 19 are provided in an outside surface of the lid 5 for storing the gaskets 13 therein. The positive electrode terminal 6 is stored in one depression 19 through the gasket 13, and the negative electrode terminal 7 is stored in the other depression 19 through the gasket 13. A through hole 20 is formed in each depression 19. An inlet 17 for introducing an electrolyte solution is opened in the lid 5, and after the electrolyte solution is introduced, the inlet is sealed with a sealing lid 18.

The positive electrode lead 3 and the negative electrode lead 4 are placed inside the container 1. The positive and negative electrode leads 3 and 4 have current collector tab junctional parts 3*b* and 4*b* to electrically connect the positive and negative electrode leads 3 and 4 to the current collector tabs 8, 9; lid junctional parts 3*a* and 4*a* to fix the positive and negative electrode leads 3 and 4 to lid 5; and vibration absorber parts to link the current collector tab junctional parts 3*b* and 4*b* to the lid junctional parts 3*a* and 4*a*.

FIG. 2 shows the positive or negative electrode lead 3 (4) used in the battery of the first embodiment. FIG. 2 shows the positive or negative electrode lead 3 (4) in an opposite direction to an installing direction of the lead in the battery, and thus the lid junctional part 3*a* (4*a*) is located below. The positive and negative electrode lead 3 (4) have the lid junctional part 3*a* (4*a*), the current collector tab junctional part 3*b* (4*b*) and the vibration absorber part 3*c* (4*c*). The lid junctional part 3*a* (4*a*) has an almost rectangular plate-like shape whose one corner is chamfered. The current collector tab junctional part 3*b* (4*b*) has a rectangular plate-like shape. The area of the lid junctional part 3*a* (4*a*) is smaller than that of the current collector tab junctional part 3*b* (4*b*). The vibration absorber part 3*c* (4*c*) has a rectangular plate-like shape, and is located between the lid junctional part 3*a* (4*a*) and the current collector tab junctional part 3*b* (4*b*).

The positive and negative electrode lead 3 (4) are bent at an almost right angle along a side separating the vibration absorber part 3*c* (4*c*) from the lid junctional part 3*a* (4*a*). The vibration absorber part 3*c* (4*c*) is placed almost perpendicularly to the lid junctional part 3*a* (4*a*) by this placement. The vibration absorber part 3*c* (4*c*) and the current collector tab junctional part 3*b* (4*b*) are located on the same plane. Thus, the current collector tab junctional part 3*b* (4*b*) is located almost perpendicularly to the lid junctional part 3*a* (4*a*).

The length X1 of the vibration absorber part 3*c* (4*c*) in a longer direction is shorter than the length Y1 of the current collector tab junctional part 3*b* (4*b*) in a longer direction, and shorter than the length W1 of the lid junctional part 3*a* (4*a*) in a longer direction. In this regard, the term "longer direction" refers to a direction crossing at a right angle to an extending direction of the positive or negative electrode current collector tab 8 or 9. The shapes of the lid junctional part 3*a* (4*a*), the current collector tab junctional part 3*b* (4*b*) and the vibration absorber part 3*c* (4*c*) are not limited to the rectangular or almost rectangular shape, and can be a square shape. In any shape, the length of the vibration absorber part 3*c* (4*c*) in the longer direction is shorter than the lengths of the lid junctional part 3*a* (4*a*) and of the current collector tab junctional part 3*b* (4*b*) in the longer direction.

The lid junctional part 3*a* has a through hole 3*e*. This through hole 3*e* is the hole for installing an axis of the positive electrode terminal 6. The lid junctional part 4*a* has a through hole 4*e*. This through hole 4*e* is the hole for installing an axis of the negative electrode terminal 7.

As shown in FIG. 1, with regard to the positive electrode lead 3, the lid junctional part 3a is laid on the inner insulator 53, which is placed on an inner surface of the lid 5. The current collector tab junctional part 3b extends downward from a bent part between it and the lid junctional part 3a. With regard to the negative electrode lead 4, the lid junctional part 4a is laid on the inner insulator 54, which is placed on an inner surface of the lid 5. The current collector tab junctional part 4b extends downward from a bent part between it and the lid junctional part 4a.

The inner insulator 53 for the positive electrode may have a rectangular plate-like shape. The inner insulator 53 for the positive electrode has a through hole 53a which communicates with the through hole 20 of the lid 5 and with the through hole 3e of the positive electrode lead 3. The inner insulator 53 for the positive electrode is placed between the inner surface of the lid 5 and the lid junctional part 3a of the positive electrode lead 3, and insulates the lid 5 and the positive electrode lead 3.

The inner insulator 54 for the negative electrode may have a rectangular plate-like shape. The inner insulator 54 for the negative electrode has a through hole 54a which communicates with the through hole 20 of the lid 5 and with the through hole 4e of the negative electrode lead 4, and a through hole 54b which communicates with the inlet for introducing a solution 17 of the lid 5. The inner insulator 54 for the negative electrode is placed between the inner surface of the lid 5 and the lid junctional part 4a of the negative electrode lead 4, and insulates the lid 5 and the negative electrode lead 4.

The positive electrode terminal 6 has a rivet-like shape, and specifically it has a flange 6a and an axis 6b which extends from the flange 6a. The axis 6b of the positive electrode terminal 6 is inserted into the through hole 20 of the lid 5 through the gasket 13, and is also inserted into the through hole 53a of the inner insulator 53 and the through hole 3e of the positive electrode lead 3. The axis is fixed to them by caulking. Similarly, the negative electrode terminal 7 has a rivet-like shape, and specifically it has a flange 7a and an axis 7b which extends from the flange 7a. The axis 7b is inserted into the through hole 20 of the lid 5 through the gasket 13, and is also inserted into the through hole 54a of the inner insulator 54 and the through hole 4e of the negative electrode lead 4. The axis is fixed to them by caulking. Thus, the positive and negative electrode terminals 6 and 7, and the lid 5 are fixed in a state in which the insulation and the air tightness are secured. In addition, the positive and negative electrode terminal 6 and 7 are fixed to the positive electrode lead 3 and the negative electrode lead 4, respectively, in a state in which an electrical connection is secured.

The positive electrode backup lead 14, which grips a tip of the positive electrode current collector tab 8, is fixed to the current collector tab junctional part 3b of the positive electrode lead 3 in a state in which an electric connection is maintained. On the other hand, the negative electrode backup lead 15, which grips a tip of the negative electrode current collector tab 9, is fixed to the current collector tab junctional part 4b of the negative electrode lead 4 in a state in which an electric connection is maintained.

The electric connection of the positive electrode lead 3 with the positive electrode backup lead 14, and the electric connection of the negative electrode lead 4 with the negative electrode backup lead 15 may be performed by using a method such as laser welding, ultrasonic joining, or resistance welding. The connection may be preferably performed by the ultrasonic joining.

The lid 5 has a rectangular plate-like shape. The lid 5 is welded to an opening part of the container 1, for example, by seam welding with a laser. The lid 5 may be formed from a metal such as aluminum, aluminum alloy, iron or stainless steel. The lid 5 is desirably formed from the same kind of metal as that of the container 1.

The lid 5 has the safety valve 21 for releasing an inner pressure of the battery. The safety valve 21 is a rectangular depression. A cross-shaped groove 22 is formed on a bottom of the depression. This part of the groove 22 is thin. The shape of the safety valve is not limited to this shape, and may be any shape so long as it is capable of releasing gas to the outside by breakage caused by the increased internal pressure of the container.

The gasket 13 is formed from, for example, polypropylene (PP), a fluorine-containing thermoplastic resin, or the like. Examples for the fluorine-containing thermoplastic resin include tetrafluoroethylene-perfluoroalkoxyethylene copolymer (PFA), tetrafluoroethylene-hexafluoropropylene copolymer (FEP), and the like.

The positive electrode terminal 6 and the negative electrode terminal 7 are formed from, for example, aluminum or aluminum alloy. In a case of a lithium ion secondary battery using a carbon material as the negative electrode active material, aluminum or aluminum alloy can be used as a material for the positive electrode terminal, and a metal such as copper, nickel or a nickel-plated iron can be used as a material for the negative electrode terminal.

The positive electrode lead 3 is formed from an electrically conductive material. As such a material, for example, aluminum or aluminum alloy may be used. The material can be arbitrarily changed depending on the kind of the positive electrode active material.

The negative electrode lead 4 is formed from an electrically conductive material. As such a material, aluminum or aluminum alloy may be used when the negative electrode active material is lithium titanate. The material can be arbitrarily changed depending on the kind of the negative electrode active material.

The electrode group 2 is vibrated in the container 1 when an impact or vibration is applied to the nonaqueous electrolyte secondary battery from the outside, for example, in the case it loaded into an electric car. The vibration is transmitted to the lid 5 through the positive and negative electrode current collector tabs 8 and 9, and the positive and negative electrode leads 3 and 4. In the nonaqueous electrolyte secondary battery of the first embodiment described above, however, the positive and negative electrode leads 3 and 4 have the vibration absorber parts 3c and 4c. The vibration absorber parts 3c and 4c can absorb the vibration. Hence, the transmission of the vibration to the lid 5 can be inhibited; as a result, breakage of the safety valve 21 equipped on the lid 5 due to the vibration can be suppressed.

Further, since the vibration is not transmitted to the lid and thus there is no risk of breakage of the safety valve in the battery of the first embodiment, it is possible to join the positive and negative electrode current collector tabs 8 and 9 to the current collector tab junctional parts 3b and 4b of the positive and negative electrode leads 3 and 4 by ultrasonic joining, respectively. This eliminates a welding step of a middle lead to the current collector tab, and thus the number of production steps can be decreased. Further, because the middle lead is unnecessary, the number of the parts can be decreased and the weight energy density of the battery can be improved.

The lead used in the battery of the first embodiment preferably has a shape satisfying the following formula (1):

$$0.12 \leq X1/Y1 \leq 0.2 \qquad (1)$$

wherein X1 is a length of the vibration absorber part 3c and 4c in a direction crossing at a right angle to an extending direction of the current collector tab 8 and 9; and Y1 is a length of the current collector tab junctional part 3b and 4b in a direction crossing at a right angle to an extending direction of the current collector tab 8 and 9. As illustrated in FIG. 2, X1 is a length of the vibration absorber part 3c (4c) in a longer direction. Y1 is a length of the current collector tab junctional part 3b (4b) in a longer direction.

The vibration absorber part satisfying X1/Y1 of 0.2 or less is low in rigidity, and can sufficiently absorb the vibration. When X1/Y1 is 0.12 or more, the strength of the lead can be maintained appropriately.

When the lead which satisfies the formula (1) described above and has a shape such that it is bent along the side separating the vibration absorber part from the lid junctional part is used, it can be further inhibited from transmitting the vibration of the electrode group to the lid through the current collector tabs, and thus breakage of the safety valve can be further suppressed. In addition, the lead having the shape described above has a resistance value which is almost the same as that of a lead having no vibration absorber part, and thus it can provide an excellent battery performance.

The length of the vibration absorber part in a longer direction is preferably a length sufficient to maintain the strength of the lead. This can prevent breakage of the lead.

A length M1 of the vibration absorber part in a direction crossing at a right angle to the longer direction is not particularly limited, and can be, for example, from 0.8 to 1.2 mm. The transmission of the vibration can be inhibited with an increase in the value of M1. The value of M1 may be arbitrarily determined depending on the space in which the lead is set and the strength of the lead.

The sizes of the lead, as shown in FIG. 2, including X1, Y1, a length of the lid junctional part 3a (4a) in a longer direction (W1), a length of the lid junctional part 3a (4a) in a direction crossing at a right angle to the longer direction (R1), and a length of the current collector tab junctional part 3b (4b) in a direction crossing at a right angle to the longer direction (Z1) are not particularly limited, and they may be arbitrarily determined depending on the sizes of the battery and the electrode, and the like.

The thickness of the lead is not particularly limited, and can be, for example, from 0.5 to 1 mm. The transmission of the vibration can be inhibited with an increase in the thickness of the lead. The thickness of the lead may be arbitrarily determined depending on the space in which the lead is set and the strength of the lead.

According to the embodiment described above, there can be provided a nonaqueous electrolyte battery with breakage of the safety valve equipped on the lid caused by the transmission of the vibration to the lid of the battery is prevented.

(Second Embodiment)

Figure 3:
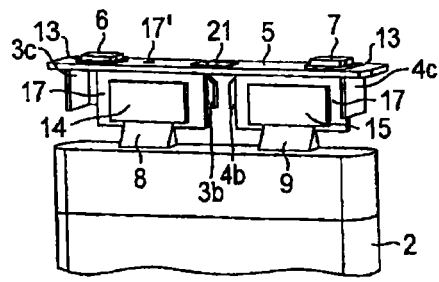
FIG. 3 is a perspective view showing a main part of a battery according to a second embodiment.
Figure 4:
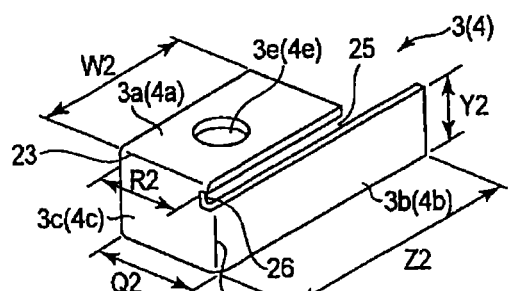
FIG. 4 is a perspective view of a lead used in the battery according to the second embodiment.

Next, a nonaqueous electrolyte secondary battery of a second embodiment will be explained referring to FIG. 3. In FIG. 3, the same numbers as those in FIGS. 1 and 2 described above denote the same members and the explanations thereof are omitted. FIG. 4 is a perspective view showing a positive and negative electrode leads 3 and 4 used in the battery shown in FIG. 3.

The positive and negative electrode lead 3 (4) has a lid junctional part 3a (4a), a current collector tab junctional part 3b (4b), and a vibration absorber part 3c (4c). The vibration absorber part 3c (4c) has an almost quadrilateral shape, and is placed along a side in a short side direction of a container 1. The lid junctional part 3a (4a) has a rectangular shape, and extends vertically from the vibration absorber part 3c (4c). The lid junctional part 3a (4a) is formed by bending along a first side 23 of the vibration absorber part 3c (4c) (an upper side in FIG. 4). The current collector tab junctional part 3b (4b) has a rectangular shape, and extends vertically from the vibration absorber part 3c (4c). The current collector tab junctional part 3b (4b) is formed by bending along a second side 24 of the vibration absorber part 3c (4c). The first side 23 and the second side 24 are adjacent to each other. The lid junctional part 3a (4a) and the current collector tab junctional part 3b (4b) extend in the same direction. There is a gap 25 between the lid junctional part 3a (4a) and the current collector tab junctional part 3b (4b), and the lid junctional part 3a (4a) is not directly brought into contact with the current collector tab junctional part 3b (4b).

The lid junctional part 3a has a through hole 3e. This through hole 3e is the hole for installing an axis of a positive electrode terminal 6. The lid junctional part 4a has a through hole 4e. This through hole 4e is the hole for installing an axis of a negative electrode terminal 7.

Figure 5:
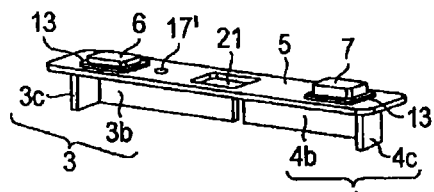
FIG. 5 is a perspective view showing a lid on which the positive and negative electrode leads shown in FIG. 4 are fixed.

As shown in FIG. 5, the positive and negative electrode leads 3 and 4 are laid on a lid 5 through an inner insulator which is not shown, and are fixed by caulking with the positive and negative electrode terminals 6 and 7. Specifically, the lid junctional part 3a of the positive electrode lead 3, the inner insulator (not shown in FIG. 5) and the lid 5 are laminated in this order, and the axis of the positive electrode terminal 6 is inserted into a through hole of the inner insulator and the through hole 3e of the lid junctional part 3a. The positive electrode lead 3 is placed so that the longer direction of the current collector tab junctional part 3b is the same as the longer direction of the lid 5, and the surface of the vibration absorber part 3c is almost parallel to the short side direction of the lid 5. The lid junctional part 4a of the negative electrode lead 4, the inner insulator (not shown in FIG. 5) and the lid 5 are laminated in this order, and the axis of the negative electrode terminal 7 is inserted into the through hole of the inner insulator and the through hole 4e of the lid junctional part 4a. The negative electrode lead 4 is placed so that the longer direction of the current collector tab junctional part 4b is the same as the longer direction of the lid 5, and the surface of the vibration absorber part 4c is almost parallel to the short side direction of the lid 5.

Figure 6:
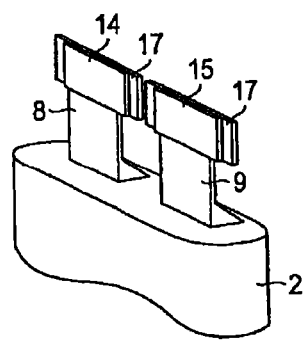
FIG. 6 is a perspective view showing a main part of an electrode group having current collector tabs to which middle leads are joined.

As shown in FIG. 6, positive and negative electrode current collector tabs 8 and 9 are respectively sandwiched by positive and negative electrode backup leads 14 and 15 which are bent in U-shaped forms. The positive and negative electrode backup leads 14 and 15 are joined to a middle lead 17 having a rectangular plate-like shape together with the positive and negative electrode current collector tab 8 and 9, respectively. The positive and negative electrode backup leads 14 and 15 may be joined to the middle lead 17 by a method such as laser welding, ultrasonic joining or resistance welding, and are preferably joined by the ultrasonic joining.

The positive and negative electrode current collector tab 8 and 9 and the backup leads 14 and 15 are joined to one surface each of the middle lead 17. As shown in FIG. 3, the other surface of the middle lead 17 is joined to the current collector tab junctional part 3b or 4b of the positive or negative electrode lead. The positive and negative electrode leads 3 and 4 may be joined to the middle lead 17 by a method such as laser welding, ultrasonic joining or resistance welding.

The positive and negative electrode leads 3 and 4 used in this embodiment are, as shown in FIG. 4, bent along a first side 23 which separates the vibration absorber part $3c$ ($4c$) from the lid junctional part $3a$ ($4a$) and bent along a second side 24 which is adjacent to the first side 23 and separates the vibration absorber part $3c$ ($4c$) from the current collector tab junctional part $3b$ ($4b$), The positive and negative electrode leads 3 and 4 have a gap 25 between the lid junctional part $3a$ ($4a$) and the current collector tab junctional part $3b$ ($4b$). When the lead has such a shape, a distance between a junctional part of the positive and negative electrode leads 3 and 4 to the lid 5 and a junctional part of the positive and negative electrode leads 3 and 4 to the positive or negative electrode current collector tab 8 or 9 can be sufficiently large while maintaining a compact size enabling them to be accommodated in the container 1, and thus the transmission of vibration can be inhibited. The nonaqueous electrolyte secondary battery of the second embodiment using such positive and negative electrode leads 3 and 4 inhibits the transmission of the vibration of an electrode group 2 to the lid 5 through the positive and negative electrode current collector tabs 8 and 9, and the positive and negative electrode leads 3 and 4, and thus the breakage of a safety valve can be suppressed.

Further, since the vibration is not transmitted to the lid and thus there is no risk of breakage of the safety valve, it is possible to join the positive and negative electrode current collector tab 8 and 9 to the current collector tab junctional part $3b$ and $4b$ of the positive and negative electrode lead by ultrasonic joining, respectively. Thus, the number of production steps and the number of parts can be decreased.

Since the positive or negative electrode lead 3 (4) having the shape described above has vibration absorber part $3c$ ($4c$) with a large area, the strength is high and it is hard to break.

The positive or negative electrode lead 3 (4) shown in FIG. 4 has a notch 26 around a corner at which the first side of the vibration absorber part $3c$ ($4c$) intersects the second side, but the lead is not limited thereto, and may have a shape with no notch.

As shown in FIG. 4, the sizes of the lead include a length (Z2) of the current collector tab junctional part $3b$ ($4b$) in a direction crossing at a right angle to the extending direction of the current collector tab 8 or 9; a length (Y2) of the current collector tab junctional part $3b$ ($4b$) in an extending direction of the current collector tab 8 or 9; a length (W2) of the lid junctional part $3a$ ($4a$) in a direction crossing at a right angle to an extending direction of the current collector tab; a length (Q2) of the vibration absorber part $3c$ ($4c$) parallel to the first side; and a length (R2) of the vibration absorber part $3c$ ($4c$) parallel to the first side of the part at which the notch 26 is located. W2 is a length of the lid junctional part $3a$ ($4a$) in a longer direction, which is a length in the same direction as a long side direction of the container 1. These sides of the lead are not particularly limited, and may be arbitrarily determined depending on the sizes of the battery and the electrode, and the like.

The thickness of the lead is not particularly limited, and can be, for example, from 0.5 to 1 mm. The transmission of vibration can be inhibited with an increase in the thickness of the lead. The thickness of the lead may be arbitrarily determined depending on the space in which the lead is set and the strength of the lead.

Figure 7:
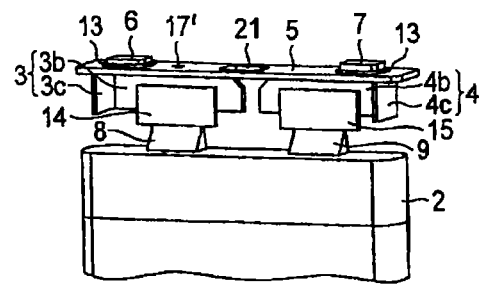
FIG. 7 is a perspective view showing a main part of a battery according to another aspect in the second embodiment.

Next, a nonaqueous electrolyte secondary battery of another aspect of the second embodiment will be explained referring to FIGS. 7 and 8. In the battery of this embodiment, positive and negative electrode leads 3 and 4 having the shape shown in FIG. 4 are used. The positive and negative electrode leads 3 and 4 are fixed on a lid 5 in the manner as shown in FIG. 5. As shown in FIG. 7, in the battery of the aspect, the positive and negative electrode leads 3 and 4 are joined to positive and negative electrode backup leads 14 and 15, respectively, without having a middle lead interposed.

Figure 8:
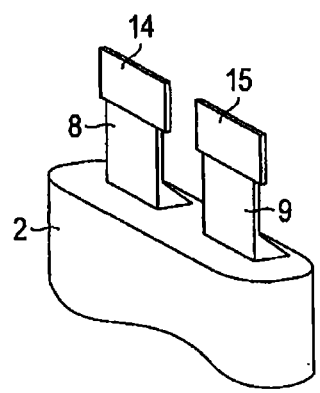
FIG. 8 is a perspective view showing a main part of an electrode group having current collector tabs to which middle leads are not joined.

As shown in FIG. 8, positive and negative electrode current collector tabs 8 and 9 are respectively sandwiched by positive and negative electrode backup leads 14 and 15 which are bent in U-shaped forms. As shown in FIG. 7, one surface of the positive and negative electrode backup leads 14 and 15 is respectively joined to a current collector tab junctional part $3b$ and $4b$ of the positive and negative electrode leads 3 and 4. The joining may be performed by a method such as laser welding, ultrasonic joining or resistance welding, and it is preferably performed by the ultrasonic joining.

Conventionally, when positive and negative electrode leads 3 and 4 were respectively joined to positive and negative electrode backup leads 14 and 15 by ultrasonic joining, vibration was transmitted to a lid, resulting in a risk of breakage of a safety valve. However, the battery of this embodiment can inhibit the vibration transmitted to the lid, and therefore, the positive and negative electrode leads 3 and 4 can be joined respectively to the positive and negative electrode backup leads 14 and 15 by ultrasonic joining. As a result, it is possible to decrease the number of production steps and the number of parts.

According to the embodiment described above, the nonaqueous electrolyte battery which prevents the breakage of the safety valve provided on the lid, caused by the transmission of vibration to the lid of the battery, can be provided.

(Third Embodiment)

Figure 9:
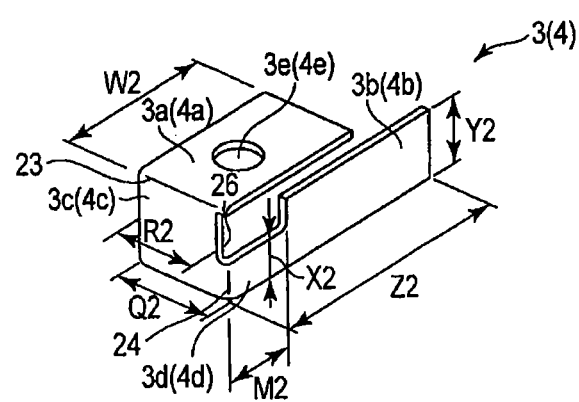
FIG. 9 is a perspective view of a lead used in a battery according to a third embodiment.

Next, a nonaqueous electrolyte secondary battery of a third embodiment will be explained referring to FIGS. 3 and 9. In FIG. 9, the same numbers as those in FIG. 4 described above denote the same members and the explanations thereof are omitted.

As shown in FIG. 9, a positive or negative electrode lead 3 (4) used in the nonaqueous electrolyte battery of the third embodiment has a shape which is the same as that of the positive or negative electrode lead 3 (4) used in the second embodiment, and further has a second vibration absorber part $3d$ ($4d$) which is brought into contact with a second side 24. The second vibration absorber part $3d$ ($4d$) is disposed between a part at which a current collector tab junctional part $3b$ ($4b$) is joined to a positive and negative electrode current collector tabs 8 and 9 or a middle lead, and a vibration absorber part $3c$ ($4c$); in other words, the second vibration absorber part $3d$ ($4d$) is not disposed at the part at which the current collector tab junctional part $3b$ ($4b$) is joined to the positive and negative electrode current collector tabs 8 and 9 or the middle lead.

The positive and negative electrode leads used in the battery of the third embodiment preferably satisfy the following formula (2):

$$0.5 \leq X2/Y2 < 1 \quad (2)$$

wherein X2 is a length of the second vibration absorber part $3d$ ($4d$) in the same direction as an extending direction of the current collector tabs 8 and 9; and Y2 is a length of the current collector tab junctional part $3b$ ($4b$) in the same direction as the extending direction of the current collector tabs 8 and 9. As illustrating in FIG. 9, X2 shows a length of the second vibration absorber part 3d (4d) crossing at a right angle to a longer direction, and Y2 shows a length of the current collector tab junctional part 3b (4b) crossing at a right angle to a longer direction. The longer direction of the second vibration absorber part 3d (4d) is the same as the longer direction of the current collector tab junctional part 3b (4b).

The vibration absorber part having X2/Y2 of less than 1 has a low rigidity and thus can absorb vibration. When X2/Y2 is 0.5 or more, the strength of lead can be appropriately maintained.

In the lead having the shape described above, a distance between a junctional part of the lead and lid and a junctional part of the lead and the current collector tab is large while the size is in a compact shape for accommodating them in the container 1. In addition, because the lead has the second vibration absorber part 3d (4d), the transmission of vibration can be further inhibited. When the lead having the shape described above is used, it is possible to inhibit the transmission of the vibration of an electrode group to the lid through the current collector tab, whereby the breakage of the safety valve can be suppressed. In addition, because the vibration is not transmitted to the lid and there is no risk of breakage of the safety valve, it is possible to join the positive and negative electrode current collector tabs 8 and 9 to the current collector tab junctional part 3b and 4b of the positive and negative electrode leads 3 and 4 by ultrasonic joining, respectively.

The length M2 of the second vibration absorber part 3d (4d) in the longer direction is not particularly limited, and it can be, for example, from 4 to 8 mm. The transmission of vibration can be inhibited with an increase in the value of M2. The value of M2 may be arbitrarily determined depending on the strength of the lead.

As shown in FIG. 9, the sizes of the lead include a length (Z2) of the current collector tab junctional part 3b (4b) in a direction crossing at a right angle to an extending direction of the current collector tabs 8 and 9; a length (W2) of the lid junctional part 3a (4a) in a direction crossing at a right angle to an extending direction of the current collector tab; a length (Q2) of the vibration absorber part 3c (4c) in a direction parallel to a first side thereof; and a length (R2) of the vibration absorber part 3c (4c) parallel to the first side of the part at which the notch 26 is located. W2 is a length of the lid junctional part 3a (4a) in a longer direction, which is a length in the same direction as a long side direction of the container 1. The sizes of the lead are not particularly limited, and may be arbitrarily determined depending on the sizes of the battery and the electrode, and the like.

The thickness of the lead is not particularly limited, and can be, for example, from 0.5 to 1 mm. The transmission of vibration can be inhibited with an increase in the thickness of the lead, and it may be arbitrarily determined depending on the space in which the lead is set and the strength of the lead.

(Fourth Embodiment)

Figure 10A:
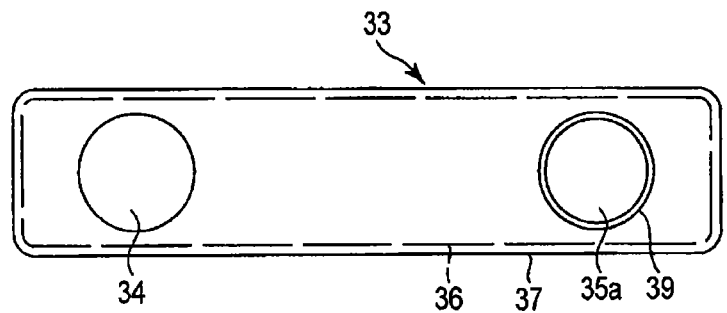
FIG. 10A is a top view of an angular battery according to a fourth embodiment.
Figure 10B:
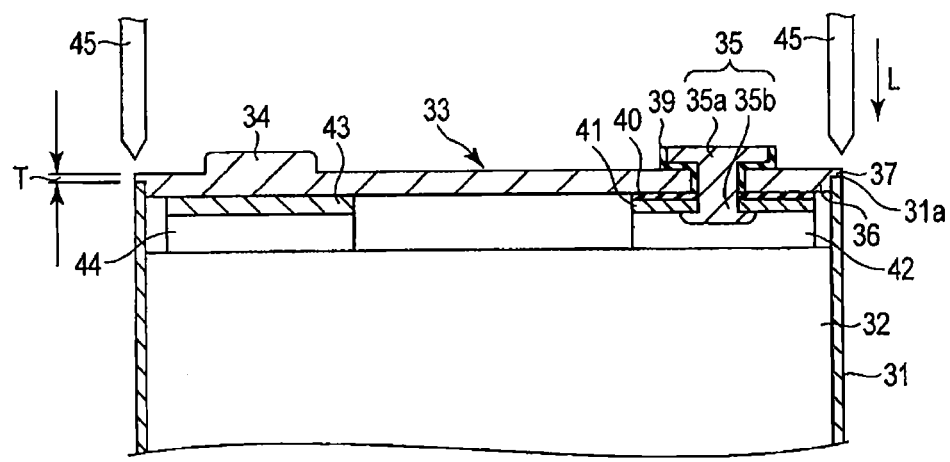
FIG. 10B is a cross-sectional view of a main part of the angular battery according to the fourth embodiment, which is cut along a long side direction.
Figure 10C:
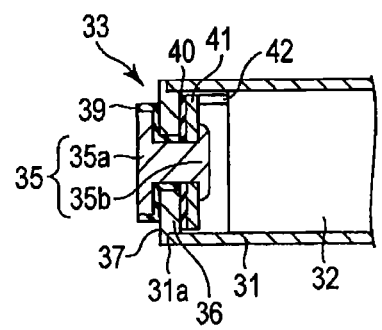
FIG. 10C is a cross-sectional view of a main part of the angular battery according to the fourth embodiment, which is cut along a short side direction.

Next, an angular nonaqueous electrolyte battery according to a fourth embodiment will be explained. As shown in FIGS. 10A, 10B and 10C, this battery has a container 31, an electrode group 32 accommodated in the container 31, a nonaqueous electrolyte solution (not shown in the drawings) contained in the container 31, a lid 33 which closes an opening part of the container 31, and a positive electrode terminal 34 and a negative electrode terminal 35 which are equipped on the lid 33. The container 31 has an angular tube shape having a bottom, and is an exterior can formed from, for example, a metal such as aluminum, aluminum alloy, iron or stainless steel.

The electrode group 32 contains a positive electrode (not shown in the drawings), a negative electrode (not shown in the drawings), and a separator (not shown in the drawings) which is placed between the positive electrode and the negative electrode, and has a flat shape. The electrode group 32 is produced, for example, by putting the separator between the positive electrode and the negative electrode, spirally winding them, and then pressure molding them into a flat shape.

As shown in FIG. 10B, a bottom 36 of the lid 33 is defined by a thickness from a bottom face to a stair part 37, and is placed inside the opening part of the container 31. A part located above the bottom 36 of the lid 33 is a stair part 37 (hereinafter referred to as a "flange 37") which protrudes outward beyond the bottom. The lid 33 has a positive electrode terminal 34, which projects convexly to the outside surface (i.e., the top surface side), and has a through hole. The negative electrode terminal 35 is fixed in the through hole by caulking. The lid 33 is formed from, for example, a metal such as aluminum, aluminum alloy, iron or stainless steel. The lid 33 is desirably formed from the same metal as the container 31.

As shown in FIGS. 10B and 10C, the negative electrode terminal 35 has a rivet-like shape. Specifically, it has a head 35a, and an axis 5b which extends from the head 35a. The negative electrode terminal 35 is fixed in the through hole of the lid 33 through an insulating gasket 39 by caulking.

A rectangular insulating plate 40 is placed on the bottom face of the lid 33. The insulating plate 40 has a through hole, and the axis 35b of the negative electrode terminal 35 is fixed in the through hole by caulking.

A rectangular negative electrode lead 41 is placed on an undersurface of the insulating plate 40. The negative electrode lead 41 has a through hole, and the axis 35b of the negative electrode terminal 35 is fixed in the through hole by caulking.

One end of a negative electrode tab 42 is electrically connected to a negative electrode of the electrode group 32, and the other end thereof is electrically connected to the negative electrode lead 41. When the tab has such a structure, the negative electrode of the electrode group 32 is electrically connected to the negative electrode terminal 35 and the negative electrode lead 41 through the negative electrode tab 42.

The negative electrode terminal 35, the negative electrode lead 41 and the negative electrode tab 42 are formed from an electrically conductive material, and the material is changed depending on the kind of the negative electrode active material. When the negative electrode active material is lithium titanate, aluminum or aluminum alloy may be used.

The rectangular positive electrode lead 43 is electrically connected to the positive electrode terminal 34 by fixing it on the bottom face of the lid 33. One end of the positive electrode tab 44 is electrically connected to a positive electrode of the electrode group 32, and the other end thereof is electrically connected to the positive electrode lead 43. When the lead has such a structure, the positive electrode of the electrode group 32 is electrically connected to the positive electrode terminal 34 and the positive electrode lead 43 through the positive electrode tab 44.

The positive electrode lead 43 and the positive electrode tab 44 are formed from an electrically conductive material, and the material can be changed depending on the kind of the positive electrode active material, and for example, aluminum or aluminum alloy may be used.

The bottom 36 of the lid 33 is placed in the opening part of the container 31, and the flange 37 is placed above an upper end of a side wall 31a of the container 31. The flange 37 of the lid 33 is welded to the upper end of the side wall 31a of the container 31 by laser seam welding. This enables the container 31 to be air-tightly sealed by the lid 33.

A method for producing the angular battery of the fourth embodiment will be explained below.

First, the electrode group 32 and other necessary members are accommodated in the container 31. After the insulating gasket 39 is inserted in the through hole of the lid 33, the axis 35b of the negative electrode terminal 35 is inserted into the insulating gasket 39, and the through holes of the insulating plate 40 and the negative electrode lead 41, and the axis 35b of the negative electrode terminal 35 is deformed to have an enlarged diameter by caulking. As a result, the axis 35b of the negative electrode terminal 35 is fixed in the through hole of the lid 33 through the insulating gasket 39 by caulking, and the insulating plate 40 and the negative electrode lead 41 are fixed on the axis 35b of the negative electrode terminal 35 by caulking.

The positive electrode of the electrode group 32 is electrically connected to the positive electrode terminal 34 of the lid 33 using the positive electrode tab 44, and the negative electrode of the electrode group 32 is electrically connected to the negative electrode terminal 35 of the lid 33 using the negative electrode tab 42. The electrical connection method may include, for example, laser welding, ultrasonic joining, resistance welding, and the like.

Subsequently, the bottom 36 of the lid 33 is inserted inside the opening part of the container 31, and the flange 37 of the lid 33 is placed at the upper end of a side wall 31a of the container 31. Laser seam welding is performed by irradiating a laser beam from a tool 45 for welding to the flange 37 of the lid 33. A direction of radiation L is set so as to be perpendicular to a surface at which the flange 37 of the lid 33 is overlaid on the upper end of a side wall 31a of the container 31. As a result, the flange 37 of the lid 33 is welded on the upper end of a side wall 31a of the container 31 by laser seam welding.

When the negative electrode terminal 35 is fixed on the lid 33 by caulking, not only the negative electrode terminal 35 is pressurized in an axial direction to deform to have an enlarged diameter, but also the pressure is applied to a periphery of the through hole. As a result, the side face of the long side of the lid 33 is curved outward on a part corresponding to the through hole. When the bottom 36 of the thus deformed lid 33 is inserted into the opening part of the container 31, the bottom 36 of the lid 33 is not fitted to the side wall around the opening part of the container 31, resulting in a gap between them. However, four sides of the flange 37 of the lid 33 are all placed on the upper end of a side wall 31a of the container 31, and thus, the flange 37 can cover the opening part of the container 31. As a result, the gap between the bottom 36 of the lid 33 and the opening part, i.e., the inner surface of the side wall of the container 31 is not exposed to the outside. In addition, when the welding is performed by irradiating a laser toward the surface at which the upper end of a side wall 31a of container 31 is overlaid on the flange 37 in a vertical direction, welding defects resulting from the gap can be decreased, and the container 31 can be air-tightly sealed with the lid 33. Furthermore, the position of the lid 33 toward the container 31 can be determined only by placing the flange 37 of the lid 33 on the upper end of a side wall 31a of the container 31, and therefore variation per product in a size such as a total height of a battery or a height of a positive or negative electrode terminal can be reduced.

When a so-called "overpick" is performed, in which the flange 37 of the lid 33 is placed on the upper end of a side wall 31a of the container 31, and a laser is irradiated from a vertical direction toward the surface at which the flange 37 is overlaid on the container 31, i.e., from the top surface of the flange 37, generation of cracks can be prevented and splashes can be decreased at a depth of about the wall thickness of the container 31, and accordingly a sufficient pressure capacity can be obtained. For example, when the wall thickness of the container 31 (i.e., the thickness of the container) is 0.5 mm, about 0.5 mm of penetration depth is necessary. On the other hand, a pressure capacity in a welded part of the lid 33 and the container 31 can be adjusted by the wall thickness of the container 31 and a working pressure of the safety valve equipped on the lid 33. Therefore, the penetration to a depth which is the same as or greater than the wall thickness of the container 31 is not necessary and the penetration depth may be 0.5 mm or less. In addition, in the case of the overpick, a welding apparatus can be biaxially controlled, and thus the processing speed can be easily increased and the cost of equipment can be reduced.

On the other hand, in a case of a so-called "sidepick" in which welding is performed from a horizontal direction toward the surface at which the flange 37 of the lid 33 is overlaid on the upper end of a side wall 31a of the container 31, a problem arises in which the flange 37 is not completely melted into the container when a penetration depth is less than the wall thickness of the container 31, and cracks are easily generated; in other words, a penetration depth which is the same as or greater than the wall thickness of the container 31 is necessary. For example, when the container 31 has a wall thickness of 0.5 mm, a penetration of 0.5 mm or more is necessary. Additionally, in the case of the sidepick, a welding apparatus is triaxially controlled, and thus it is hard to increase the processing speed and reduce the cost of equipment.

As stated above, the penetration depth in the case in which the laser is irradiated from the vertical direction toward the surface at which the flange 37 is overlaid on the container 31 can be made less than that in the case in which the laser is irradiated from the horizontal direction toward the overlaid surface. As a result, the laser output can be set at a lower level, and it is advantageous in terms of inhibition of the quantity of splashes generated and an increase in the processing speed.

After the laser welding, an electrolyte solution is injected from an inlet for injecting an electrolyte solution (not shown in the drawing) equipped on the lid 33, and after that the inlet for injecting a solution is sealed with a seal lid (not shown in the drawing), thereby obtaining an angular nonaqueous electrolyte battery. According to such a production method, a welding yield can be improved.

The thickness T of the flange 37 of the lid 33 is desirably a thickness which is the same as the wall thickness of the container 31 or less, and it is more preferably within a range of 0.5 mm or less. Thus, a complete penetration depth of the flange 37 which is required in the overpick welding can be made less than the wall thickness of the container 31, for example, 0.5 mm or less, and thus the laser output can be further reduced.

The wall thickness of the container 31 is not particularly limited so long as it is the same as the thickness T of the flange 37 or more.

The welding can be performed using a laser beam such as a carbonic acid gas laser or YAG laser.

In a case of a lithium ion secondary battery using a carbon material as the negative electrode active material, aluminum or aluminum alloy is generally used as the material for the positive electrode terminal, the positive electrode lead, the positive electrode tab, and the like; and a metal such as copper, nickel or nickel-plated iron is used as the material for the negative electrode terminal, the negative electrode lead, the negative electrode tab, and the like.

According to the fourth embodiment, a part of the lid 33 is used as the positive electrode terminal 34, and the negative electrode terminal 35 is attached to the lid 33 by caulking, but a part of the lid 33 may be used as the negative electrode terminal 35, and the positive electrode terminal 34 may be attached to the lid 33 by caulking. Alternatively, both of the positive and negative electrode terminals 4 and 5 can be attached to the lid 33 by caulking.

According to the embodiment described above, the angular battery having the lid with the electrode terminals attached thereto by caulking can be provided and welding yields can be improved in the production method thereof.

(Fifth Embodiment)

Figure 11A:
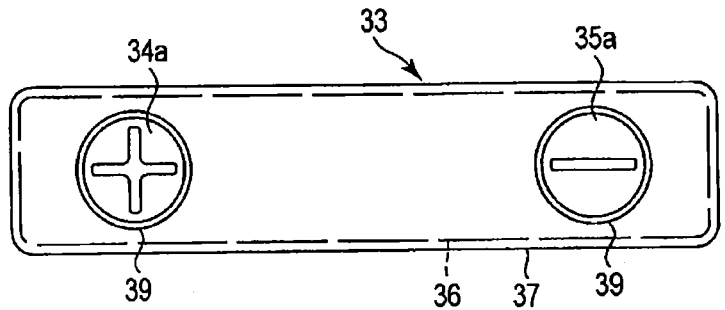
FIG. 11A is a top view of an angular battery according to a fifth embodiment.
Figure 11B:
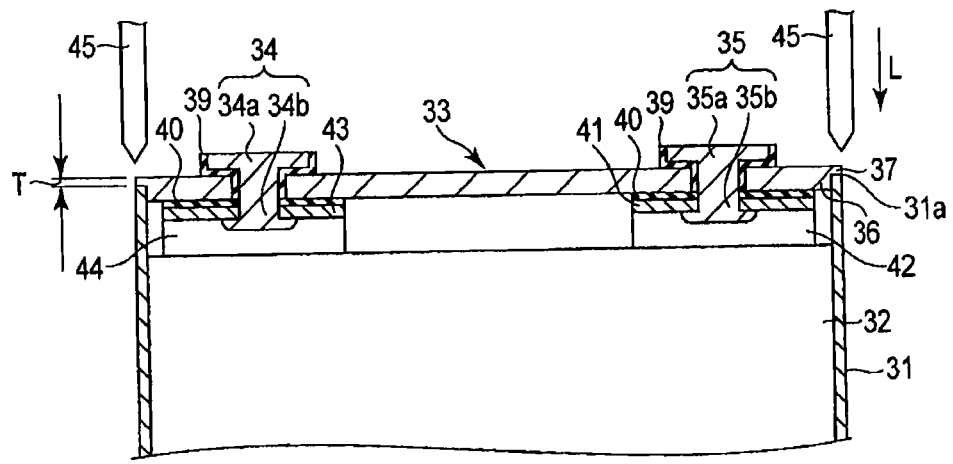
FIG. 11B is a cross-sectional view of a main part of the angular battery of the fifth embodiment, which is cut along a long side direction.
Figure 11C:
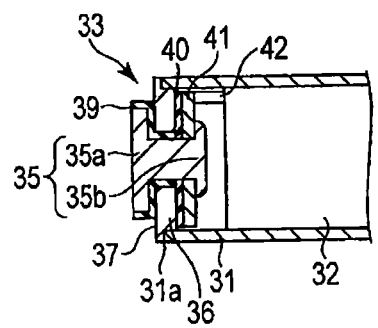
FIG. 11C is a cross-sectional view of a main part of the angular battery according to the fifth embodiment, which is cut along a short side direction.

An angular nonaqueous electrolyte battery of a fifth embodiment is shown in FIGS. 11A, 11B and 11C. FIG. 11 is a top view of the angular battery of the fifth embodiment; FIG. 11B is a cross-sectional view of a main part of the angular battery, which is cut along a long side direction; and FIG. 11C is a cross-sectional view of a main part of the angular battery, which is cut along a short side direction. The battery according to this embodiment has the same structure as that of the angular nonaqueous electrolyte battery according to the fourth embodiment, except that a shape of a lid and a method for attaching a positive electrode terminal are different. Hereinafter, In the battery of the fifth embodiment, the same numbers as those in the fourth embodiment denote the same members and the explanations thereof are omitted.

As shown in FIGS. 11A, 11B and 11C, in the battery according to the embodiment, a positive electrode terminal 34 is fixed on a lid 33 by caulking together with a negative electrode terminal 35.

Figure 12A:
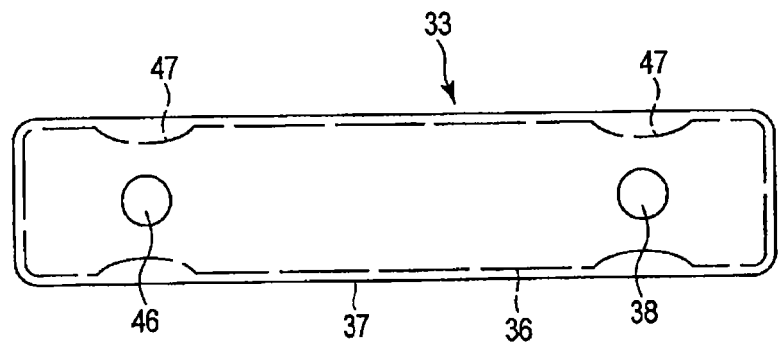
FIG. 12A is a top view of a lid used in the angular battery according to the fifth embodiment.
Figure 12B:
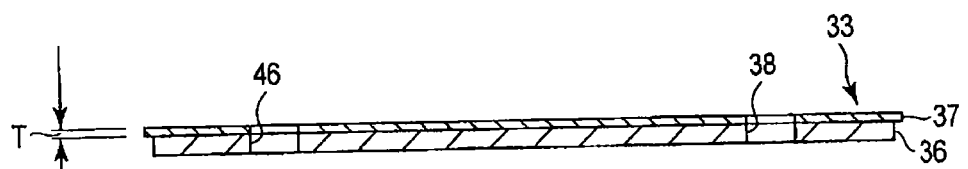
FIG. 12B is a cross-sectional view of the lid used in the angular battery according to the fifth embodiment, which is cut along a long side direction.
Figure 12C:
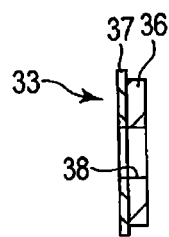
FIG. 12C is a cross-sectional view of the lid used in the angular battery according to the fifth embodiment, which is cut along a short side direction.

As shown in FIGS. 12A, 12B and 12C, the lid 33 has a through hole 38 to which the negative electrode terminal 35 is fixed by caulking, and a through hole 46 to which the positive electrode terminal 34 is fixed by caulking. As shown in FIG. 12A, a bottom 36 of the lid 33 has four depressions 47 on both side in a long side direction. These four depression 47 are placed so that they form a line with the through hole 38 or 46 in a short side direction of the lid 33. By this placement, a part in which the through holes 38, 46 are crossed is made shorter than other parts, in a width of the bottom 36 in a short side direction.

Figure 13A:
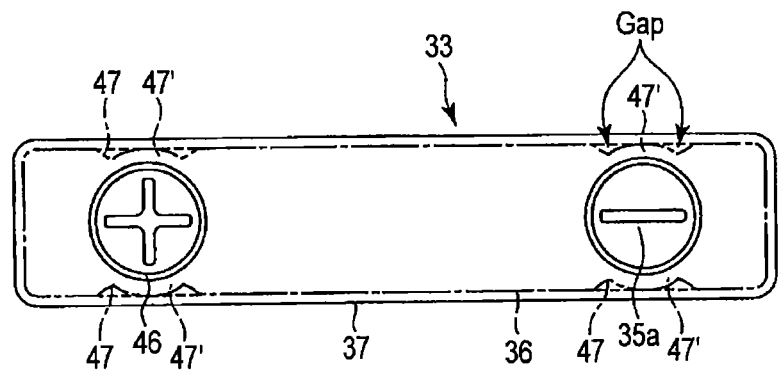
FIG. 13A is a top view of an opening-sealing member used in the angular battery according to the fifth embodiment.
Figure 13B:
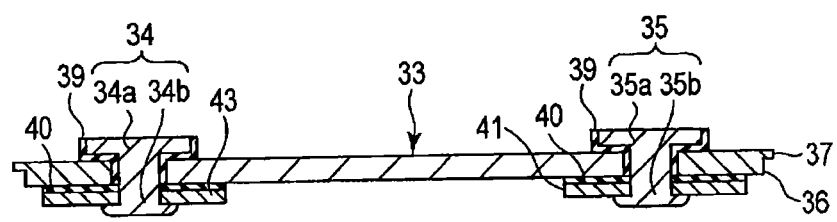
FIG. 13B is a cross-sectional view of the opening-sealing member used in the angular battery according to the fifth embodiment, which is cut along a long side direction.
Figure 13C:
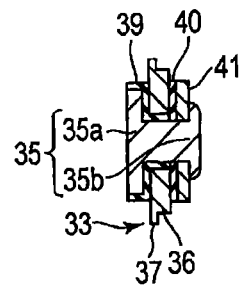
FIG. 13C is a cross-sectional view of the opening-sealing member used in the angular battery according to the fifth embodiment, which is cut along a short side direction.

FIGS. 13A, 13B and 13C show an opening-sealing member. This opening-sealing member is a member in which the positive and negative electrode terminals 34, are attached to the lid 33 having the shape shown in FIGS. 12A, 12B and 12C by caulking. The opening-sealing member contains the lid 33, the positive and negative electrode terminals 34 and 35, an insulating gasket 39, an insulating plate 40, and positive and negative electrode leads 43 and 41.

As shown in FIG. 13B, the positive electrode terminal 34 has a rivet-like shape. Specifically, it has a head 34a and an axis 34b which extends from the head 34a. The positive electrode terminal 34 is fixed in the through hole 46 of the lid 33 through the insulating gasket 39 by caulking. Further, the rectangular insulating plate 40, which is placed on the bottom face of the lid 33, and the rectangular positive electrode lead 43, which is placed on the undersurface of the insulating plate 40, are fixed on the axis 34b of the positive electrode terminal 34 by caulking. When the positive electrode of the electrode group 32 has such a structure, it is electrically connected to the positive electrode terminal 34 through the positive electrode tab 44 and the positive electrode lead 43.

As shown in FIGS. 13B and 13C, the negative electrode terminal 35 has a rivet-like shape. Specifically, it has a head 35a and an axis 35b which extends from the head 35a. The negative electrode terminal 35 is fixed in the through hole 38 of the lid 33 through the insulating gasket 39 by caulking. Further, the rectangular insulating plate 40, which is placed on the bottom face of the lid 33, and the rectangular negative electrode lead 41, which is placed on the undersurface of the insulating plate 40, are fixed on the axis 35b of the negative electrode terminal 35 by caulking. When the negative electrode of the electrode group 32 has such a structure, the electrode is electrically connected to the negative electrode terminal 35 through the negative electrode tab 42 and the negative electrode lead 41.

As shown in FIG. 13A, when the positive and negative electrode terminals 34 and 35 are fixed on the lid 33 by caulking in this embodiment, the bottom 36 of the lid 33 is deformed and protrusions 47' are generated at positions corresponding to the through holes 46 and 38. However, protrusion 47 are made in anticipation of the deformation volumes of these protrusions 47', and therefore, the protrusions 47' fall within a range of the depressions 47. As a result, when the bottom 36 of the lid 33 is inserted into an opening part of the container 31, a gap generated between the bottom 36 of the lid 33 and a side wall around the opening part of the container 31 can be reduced. In addition, the flange 37 can cover the opening part of the container 31 because the lid 33 has the flange 37. Thus, the gap generated between the bottom 36 of the lid 33 and the side wall around the opening part of the container 31 is not exposed to the outside. As a result, welding defects resulting from the gap between the lid 33 and the container 31 can be further reduced. The deformation of the lid 33 can be reduced because the deformation of the bottom 36 of the lid 33 due to the caulking occurs in the depressions 47, and therefore variation per product in a size such as a total height of a battery or a height of a positive or negative electrode terminal can be further reduced. In order to assemble an assembled battery from the angular batteries, laser welding of bus bars to the positive and negative electrode terminals 34 and 35 equipped on the lid 33 is necessary. According to the fifth embodiment, the variation in the height of the battery can be reduced, and thus a yield of the laser welding can be improved in the production of the assembled battery.

The lids used in the fourth and fifth embodiments have a shape in which all parts disposed above the bottom are the flange part, but they are not limited to this shape, and, for example, it is possible to make a stair part having a smaller area than that of the flange at the top surface of the flange.

According to the embodiment described above, the angular battery having the lid with the electrode terminals attached thereto by caulking can be provided and welding yields can be improved in the production method thereof.

(Positive Electrode)

The positive electrode used in the first to fifth embodiments will be explained. The positive electrode can be formed, for example, by coating a current collector with slurry containing a positive electrode active material. The positive electrode active material is not particularly limited, and oxides, sulfides or polymers capable of occluding and releasing lithium can be used. Examples of the preferable active material include lithium manganese complex oxides, lithium nickel complex oxides, lithium cobalt complex oxides, and lithium iron phosphate, which can provide a high positive electrode potential. The current collector can be formed, for example, from an aluminum foil or an aluminum alloy foil.

(Negative Electrode)

The negative electrode used in the first to fifth embodiments will be explained. The negative electrode can be formed, for example, by coating a current collector with slurry containing a negative electrode active material. The negative electrode active material is not particularly limited, and metal oxides, metal sulfides, metal nitrides, alloy or carbon capable of occluding and releasing lithium can be used. Materials having an occlusion and release potential of lithium ion of 0.4 V or more noble to a metal lithium potential are preferably used. The negative electrode active material having such an occlusion and release potential of lithium ion can inhibit an alloy reaction of the aluminum or aluminum alloy with the lithium. Therefore, it is possible to use aluminum or aluminum alloy for forming the negative electrode current collector and related parts of the negative electrode. Examples of such a negative electrode active material include titanium oxides, lithium titanium oxides, tungsten oxides, amorphous tin oxides, tin silicon oxides, and silicon oxides. Lithium titanium complex oxides are particularly preferable. The current collector can be formed, for example, from an aluminum foil or an aluminum alloy foil.

(Separator)

The separator used in the first to fifth embodiments will be explained. As the separator, for example, microporous films, woven fabrics, non-woven fabrics or laminates thereof may be used. The laminate may be formed from the same material or different materials. Examples of the material forming the separator include polyethylene, polypropylene, ethylene-propylene copolymers, and ethylene-butene copolymers.

(Electrolyte Solution)

The electrolyte solution used in the first to fifth embodiments will be explained. A nonaqueous electrolyte solution may be used as the electrolyte solution. The nonaqueous electrolyte solution can be prepared by dissolving an electrolyte such as a lithium salt in a nonaqueous solvent. Examples of the nonaqueous solvent include ethylene carbonate (EC), propylene carbonate (PC), butylene carbonate (BC), dimethyl carbonate (DMC), diethyl carbonate (DEC), ethylmethyl carbonate (EMC), γ-butyrolactone (γ-BL), sulfolane, acetonitrile, 1,2-dimethoxyethane, 1,3-dimethoxypropane, dimethyl ether, tetrahydrofuran (THF) and 2-methyltetrahydrofuran. The nonaqueous solvent may be used alone or as a mixture of two or more kinds. Examples of the electrolyte include lithium salts such as lithium perchlorate ($LiClO_4$), lithium hexafluorophosphate ($LiPF_6$), lithium tetrafluoroborate ($LiBF_4$), lithium arsenic hexafluoride ($LiAsF_6$), and lithium trifluoromethasulfonate ($LiCF_3SO_3$). The electrolyte may be used alone or as a mixture of two or more kinds. The amount of the electrolyte dissolved in the nonaqueous solvent is preferably within a range of 0.2 mol/L to 3 mol/L.

EXAMPLE

Experiment 1

Examples of the embodiment will be explained below. A specimen for test in which a lead fixed on a lid was connected to a backup lead which sandwiched a current collector tab extended from an electrode group was made. In order to examine whether or not a safety valve was broken by applying vibration to the lid, the lead was joined to the backup lead by ultrasonic joining.

(Specimen 1)

A lead used in the battery of the first embodiment and having a shape shown in FIG. 2 was made using aluminum. Sizes of the lead were: X1 was 3.5 mm, Y1 was 25.5 mm, Z1 was 5.5 mm, W1 was 13.5 mm, R1 was 7.0 mm, M1 was 0.8 mm, and a thickness was 0.8 mm. X1/Y1 was 0.137.

The lid junctional part of the lead was fixed to the lid by caulking output terminals. Then a current collector tab junctional part of the lead was joined to each backup lead which sandwiched a current collector tab of a positive or negative electrode by ultrasonic joining to make a sample.

MODEL 2000 manufactured by Branson was used as an ultrasonic joining machine. A joined sample was A1050-H 0.8 mmt, and its horn shape was 2 peaks (a pitch of 3.6 mm). A pressure of 450 N was applied, amplitude was 80%, and a test time (joining time) was 0.5 seconds.

As results of the ultrasonic joining, there was no breakage of a safety valve in 100 samples tested.

In addition, resistance values between a center of the lid junctional part of the lead and a center of the current collector tab junctional part were measured, and an average value thereof was calculated. A value of 0.13 mΩ was obtained. Test conditions and measurement results are shown in Table 1.

(Specimen 2)

Tests were performed in the same manner as in those for the specimen 1 except that a lead having X1 of 5.0 mm and X1/Y1 of 0.196 was used. As results of ultrasonic joining, breakage of a safety valve occurred in two samples of 100 samples tested. The lead had a resistance value of 0.12 mΩ. Test conditions and measurement results are shown in Table 1.

(Specimen 3)

Tests were performed in the same manner as in those for the specimen 1 except that a lead having X1 of 2.0 mm and X1/Y1 of 0.078 was used. As for the specimen 3, tests of 100 samples were scheduled to be performed, but leads were broken in all 30 samples upon ultrasonic joining since the test had started, and therefore, the experiment was stopped when the 30 samples were tested. The lead had a resistance value of 0.14 mΩ. Test conditions and measurement results are shown in Table 1.

Comparative Example 1

Figure 14:
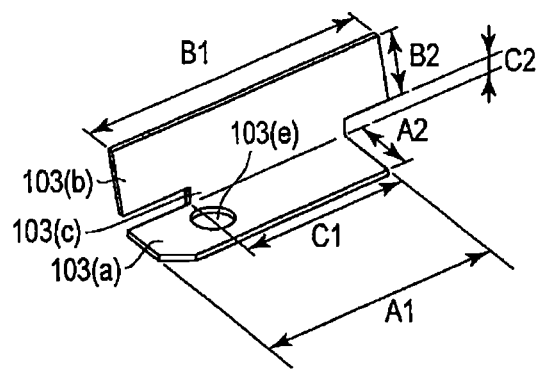
FIG. 14 is a perspective view showing a lead used in Comparative Example 1.

In Comparative Example 1, a lead having a shape shown in FIG. 14 was used. This lead had a lid junctional part 103 (a), a current collector tab junctional part 103 (b), and a linkage 103 (c) which linked the lid junctional part 103 (a) to the current collector tab junctional part 103 (b), and had a shape which was bent almost at a right angle along a side separating the linkage 103 (c) from the lid junctional part 103 (a).

A length A1 of the lid junctional part 103 (a) in a longer direction was 20.5 mm, a length A2 of the lid junctional part 103 (a) crossing at a right angle to the longer direction was 7.0 mm, a length B1 of the current collector tab junctional part 103(b) in a longer direction was 25.5 mm, a length B2 of the current collector tab junctional part 103 (b) crossing at a right angle to the longer direction was 5.5 mm, a length C1 of the linkage 103 (c) in a longer direction was 7.5 mm, a length C2 of the linkage 103 (c) crossing at a right angle to the longer direction was 0.9 mm, and a thickness was 0.8 mm. C1/B1 was 0.57. Tests were performed in the same manner as in those for the specimen 1 except that the lead having the shape described above was used.

In Comparative Example 1, breakage of a safety valve occurred in 78 samples among 100 samples tested. The lead had a resistance value of 0.11 mΩ. Test conditions and measurement results are shown in Table 1.

TABLE 1

|  | X1/Y1 | Pressure applied | Amplitude | Joining time | Resistance | Results |
|---|---|---|---|---|---|---|
| Specimen 1 | 0.137 | 450 N | 80% | 0.5 seconds | 0.13 mΩ | 0/100 pcs occurrence of breakage |
| Specimen 2 | 0.196 | 450 N | 80% | 0.5 seconds | 0.12 mΩ | 2/100 pcs occurrence of breakage |
| Specimen 3 | 0.078 | 450 N | 80% | 0.5 seconds | 0.14 mΩ | Lead was broken upon the ultrasonic joining (impossible to test) |
| Comparative Example 1 | — | 450 N | 80% | 0.5 seconds | 0.11 mΩ | 78/100 pcs occurrence of breakage |

Table 1 shows that the breakage in the specimen 1 and 2 using the lead having X1/Y1 within a range of 0.12 or more and 0.2 or less occurred less frequently than in Comparative Example 1, and that the vibration was hardly transmitted to the lid. In addition, it was shown that the leads in the specimens 1 and 2 had a resistance value which was almost the same as that of the lead having no vibration absorber part in Comparative Example 1, and a battery performance was not influenced. On the other hand, due to the fact that the lead in the specimen 3 was broken upon the ultrasonic joining, the results showed that the lead having X1/Y1 of less than 0.12 had a low strength.

Experiment 2

Tests were performed in different ultrasonic joining conditions.
(Specimen 4)
Samples were made using the same lead as that in the specimen 1 except that a pressure of 1000 N was applied upon the ultrasonic joining, an amplitude was 90%, and a testing time (joining time) was one second. As results of the ultrasonic joining, breakage of a safety valve occurred in three samples among 100 samples tested. The lead had a resistance value of 0.13 mΩ. Test conditions and measurement results are shown in Table 2.
(Specimen 5)
A lead used in the battery of the second embodiment and having a shape shown in FIG. 4 was made using aluminum. Sizes of the lead were: Y2 was 5.5 mm, Z2 was 21 mm, W2 was 13.5 mm, R2 was 8.0 mm, Q2 was 8.5 mm, and a thickness was 0.8 mm. Ultrasonic joining conditions were the same as those for the specimen 4.
As results of ultrasonic joining, there was no breakage of a safety valve in 100 samples tested. The lead had a resistance value of 0.15 mΩ. Test conditions and measurement results are shown in Table 2.

(Specimen 6)
A lead used in the battery of the third embodiment and having a shape shown in FIG. 9 was made using aluminum. Sizes of the lead were: X2 was 4.5 mm, and M2 was 5.8 mm. X2/Y2 was 0.818. Other sizes were the same as those of the lead used in the specimen 5. Ultrasonic joining conditions were the same as those in the specimen 4.

As results of ultrasonic joining, there was no breakage of a safety valve in 100 samples tested. The lead had a resistance value of 0.15 mΩ. Test conditions and measurement results are shown in Table 2.
(Specimen 7)
A lead having the same sizes as those of the lead in the specimen 6 except that X2 was 3.0 mm and X2/Y2 was 0.545 was used. Ultrasonic joining conditions were the same as those in the specimen 4.

As results of ultrasonic joining, there was no breakage of a safety valve in 100 samples tested. The lead had a resistance value of 0.16 mΩ. Test conditions and measurement results are shown in Table 2.
(Specimen 8)
A lead having the same sizes as those of the lead in the specimen 6 except that X2 was 2.0 mm and X2/Y2 was 0.364 was used. Ultrasonic joining conditions were the same as in the specimen 4.

As for the specimen 8, tests of 100 samples were scheduled to be performed, but leads were broken in all 30 samples upon ultrasonic joining since the test had started, and therefore, the experiment was stopped when the 30 samples were tested. The lead had a resistance value of 0.17 mΩ. Test conditions and measurement results are shown in Table 2.

Comparative Example 2

Tests were performed in the same manner as those for the specimen 4 except that a lead which was the same as that in Comparative Example 1 was used. In Comparative Example 2, breakage of a safety valve occurred in all 100 samples tested. The lead had a resistance value of 0.11 mΩ. Test conditions and measurement results are shown in Table 2.

TABLE 2

|  | X1/Y1 | X2/Y2 | Pressure applied | Amplitude | Joining time | Resistance | Results |
|---|---|---|---|---|---|---|---|
| Specimen 4 | 0.137 | — | 1,000 N | 90% | 1 seconds | 0.13 mΩ | 3/100 pcs occurrence of breakage |
| Specimen 5 | — | — | 1,000 N | 90% | 1 seconds | 0.15 mΩ | 0/100 pcs occurrence of breakage |
| Specimen 6 | — | 0.818 | 1,000 N | 90% | 1 seconds | 0.15 mΩ | 0/100 pcs occurrence of breakage |
| Specimen 7 | — | 0.545 | 1,000 N | 90% | 1 seconds | 0.16 mΩ | 0/100 pcs occurrence of breakage |

TABLE 2-continued

|  | X1/Y1 | X2/Y2 | Pressure applied | Amplitude | Joining time | Resistance | Results |
|---|---|---|---|---|---|---|---|
| Specimen 8 | — | 0.364 | 1,000 N | 90% | 1 seconds | 0.17 mΩ | Lead was broken upon the ultrasonic joining (impossible to test) |
| Comparative Example 2 | — | — | 1,000 N | 90% | 1 seconds | 0.11 mΩ | 100/100 pcs occurrence of breakage |

It was shown that the breakage occurred less frequently in the specimen 4 than in Comparative Example 2, and even if the ultrasonic joining was performed at a high pressure and high amplitude for a long period of time, transmission of the vibration to the lid could be inhibited.

In addition, it was shown that in the specimens 5 to 7 using the lead having X2/Y2 of 0.5 or more, no breakage occurred and even if the ultrasonic joining was performed at a high pressure and high amplitude for a long period of time, transmission of the vibration to the lid could be inhibited.

On the other hand, due to the fact that the lead in the specimen 8 was broken upon the ultrasonic joining, it was shown that the lead having an X2/Y2 of less than 0.5 had a low strength.

Experiment 3

Samples were made in the same flow, using the same leads as in the specimen 1, the specimen 6 and Comparative Example 1, and whether a safety valve was broken or not upon the manufacturing flow was confirmed. Ultrasonic joining conditions were: a pressure of 535 N was applied, amplitude was 36 μm, and a joining time was 0.8 seconds at a time. The results are shown in Table 3.

TABLE 3

|  | Pressure applied | Amplitude | Test time | The number of samples | Results |
|---|---|---|---|---|---|
| Specimen 1 | 535 N | 36 μm | 0.8 seconds at a time | 500 pcs | No safety valve was broken by ultrasonic joining |
| Specimen 6 | 535 N | 36 μm | 0.8 seconds at a time | 500 pcs | No safety valve was broken by ultrasonic joining |
| Comparative Example 1 | 535 N | 36 μm | 0.8 seconds at a time | 300 pcs | Safety valve was broken at 102 pcs by ultrasonic joining |

As shown in Table 3, in the samples using the leads used in the specimens 1 and 6, there was no breakage of the safety valve in all 500 samples. On the other hand, in the samples using the lead used in Comparative Example 1, breakage occurred of a safety valve in 102 samples among 300 samples.

Experiment 4

Example 1

Twenty angular nonaqueous electrolyte batteries were produced in the same manner as in the fourth embodiment. The angular nonaqueous electrolyte battery had the same structure as that shown in FIG. 10 except that a positive electrode terminal 34 was fixed to a lid 33 by caulking shown in FIG. 11. A plate formed from aluminum alloy of JIS-A-3003 having a plate thickness of 0.5 mm was used for a container 31. A lid formed from aluminum alloy of JIS-A-3003, having a thickness of 0.2 mm of flange 37, and a total thickness of 1.1 mm was used for the lid 33.

Example 2

Twenty angular nonaqueous electrolyte batteries were produced in the same manner as those in Example 1 except that the thickness of the flange 37 was changed to 0.4 mm.

Comparative Example 3

Figure 15:
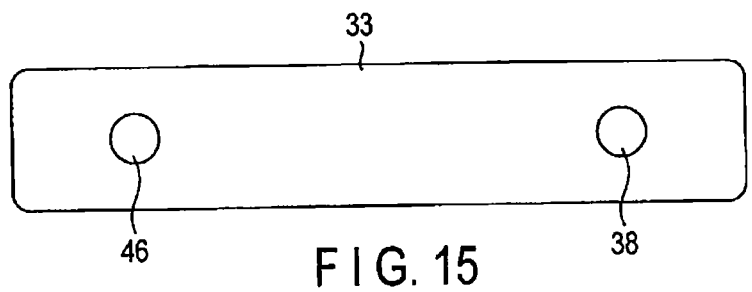
FIG. 15 is a top view of a lid used in an angular battery according to Comparative Example 3.
Figure 16:
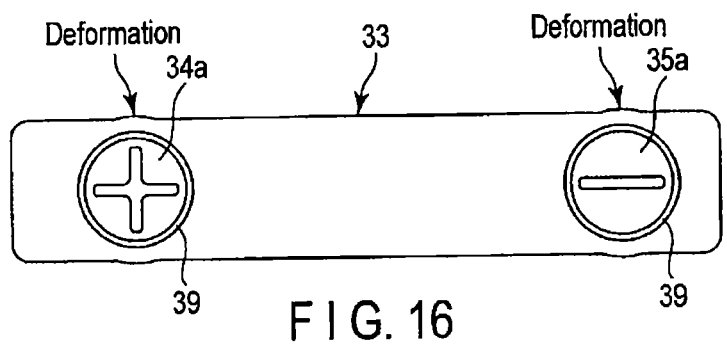
FIG. 16 is a top view of an opening-sealing member used in the angular battery according to Comparative Example 3.

A lid 33 on which a flange 37 was not provided, as shown in FIG. 15, was used. When positive and negative electrode terminals 34 and 35 were fixed in through holes 46 and 38 in this lid 33 by caulking, respectively, parts corresponding to the through holes 46 and 38 on both sides of the lid 33 in a long side direction were deformed outward, as shown in FIG. 16. As shown in FIG. 17A, the lid 33 whose both sides were deformed was fitted into an opening part of a container 31. After that, as shown in FIG. 17B, laser seam welding was performed by irradiating a laser beam parallel to a surface at which the side of the lid 33 was overlaid on the opening part of the container 31 (i.e., a side wall inner surface) from a tool for welding 45.

Twenty angular nonaqueous electrolyte batteries were produced in the same manner as those in Example 1 except for the procedures described above. A cross-sectional view of the angular battery of Comparative Example 3, which was cut along a short side direction, is shown in FIG. 17C.

As for the batteries of Examples 1 and 2 and Comparative Example 3, an average height difference (population parameter n=20) in some spots on a top surface of the lid 33 after laser welding was measured. The spots where the height was measured were three spots: a center of the lid 33 (for example, a spot C shown in FIG. 17A), one end of the lid 33 in a long side direction (for example, a spot A shown in FIG. 17A), and the other end thereof (for example a spot B shown in FIG. 17A). The height at the spot A and the height at the spot B were compared with the height at the center C of the lid 33 which was set as a standard. When the height at the spot A or the spot B was lower than the standard, the difference was shown as a negative value in Table 4, and when the height thereof was higher than the standard, the difference was shown as a positive value in Table 4.

TABLE 4

|  |  | Spot A | Center of lid C (standard) | Spot B |
|---|---|---|---|---|
| Comparative Example 3 | No flange | −0.08 mm | 0.00 mm | −0.11 mm |
| Example 1 | Flange 0.2 mm | 0.00 mm | 0.00 mm | +0.01 mm |
| Example 2 | Flange 0.4 mm | 0.00 mm | 0.00 mm | 0.00 mm |

As is apparent from Table 4, in Comparative Example 3 in which the lid having no flange was used, the heights at both ends A and B were lower by about 0.1 mm than that at the center C of the lid which was set as the standard, and therefore the center C was convexly formed. Additionally, as shown in FIG. 17A, there were gaps between the lid 33 and the container 31 because the shape of the side of the lid 33 did not fit with the shape of the opening part of the container 31.

On the contrary, in Examples 1 and 2 in which the lids having the flange were used, the heights at the spots A and B were within a range of ±0.01 mm in both Example 1 in which the flange thickness was 0.2 mm and Example 2 in which the thickness was 0.4 mm, which were excellent.

Experiment 5

Comparative Example 4

Figure 18:
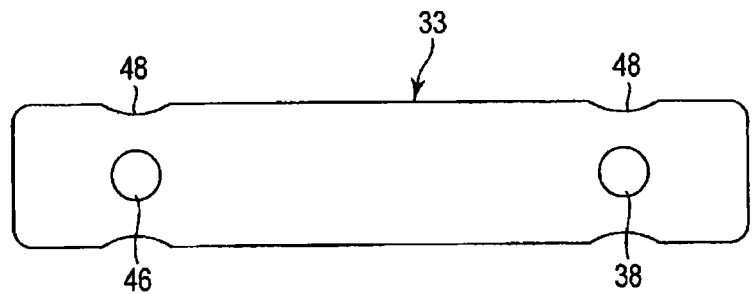
FIG. 18 is a top view of a lid used in an angular battery according to Comparative Example 4.
Figure 19:
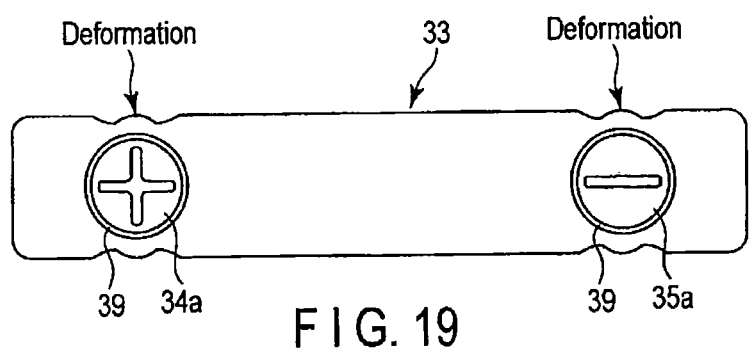
FIG. 19 is a top view of an opening-sealing member used in an angular battery according to Comparative Example 4.
Figure 20A:
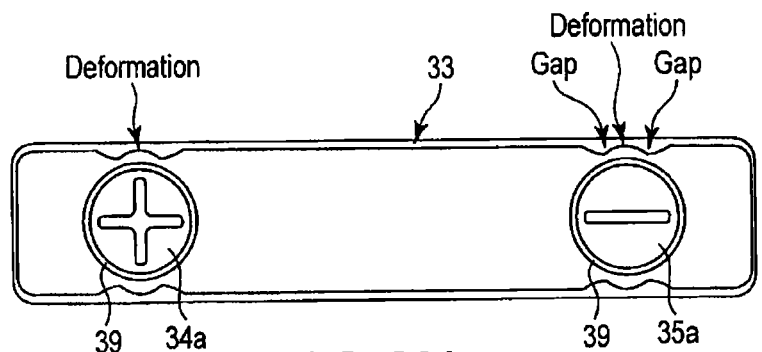
FIG. 20A is a top view of the angular battery according to Comparative Example 4.
Figure 20B:
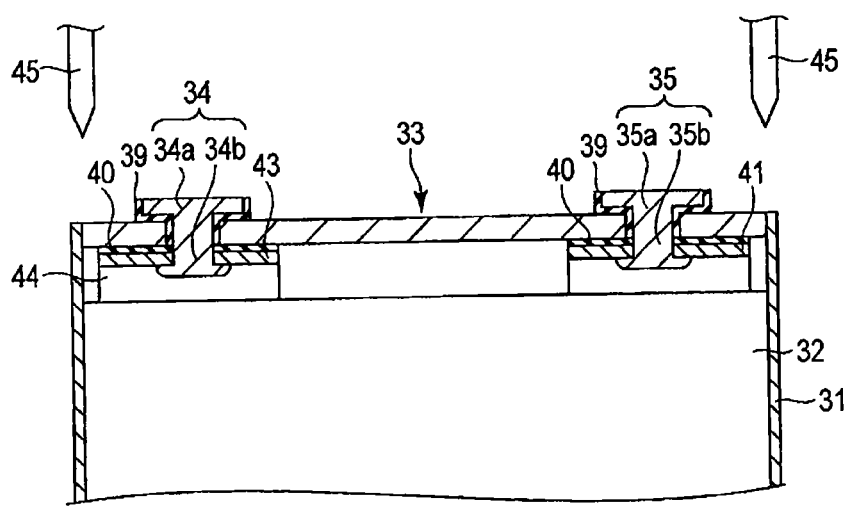
FIG. 20B is a cross-sectional view of the angular battery according to Comparative Example 4, which is cut along a long side direction.

As shown in FIG. 18, a lid 33 in which four parts 48 corresponding to through holes 46 and 38 on long sides became dented inward, and which had no flange 37 was used. When positive and negative electrode terminals 34 and 35 were fixed in through holes 46 and 38 of this lid 33 by caulking, respectively, parts corresponding to the through holes 46 and 38 on both sides of the lid 33 in a long side direction were slightly curved outward, as shown in FIG. 19. As shown in FIG. 20A, the lid 33 whose sides were deformed was fitted into an opening part of a container 31. After that, as shown in FIG. 20B, laser seam welding was performed by irradiating a laser beam parallel to a surface at which the side face of the lid 33 was overlaid on the opening part of the container 31 (i.e., a side wall inner surface) from a tool for welding 45.

Figure 20C:
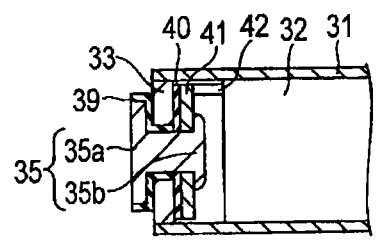
FIG. 20C is a cross-sectional view of the angular battery according to Comparative Example 4, which is cut along a short side direction.

Angular nonaqueous electrolyte batteries were produced in the same manner as those in Example 1 except for the procedures described above. A cross-sectional view of the angular battery of Comparative Example 4, which was cut along a short side direction, is shown in FIG. 20C.

As shown in FIG. 20A, welding defects occurred because there were gaps between a side wall around an opening part of the container 31 and the sides of the lid 33.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A battery comprising:
a container;
an electrode group comprising a positive electrode and a negative electrode and being accommodated in the container;
a plurality of current collector tabs extended from a plurality of points of a current collector of at least one electrode of the positive electrode and the negative electrode in the electrode group;
a lid closing an opening part of the container;
a lead comprising a current collector tab junctional part connected with the current collector tabs electrically, a lid junctional part fixed to the lid, and a vibration absorber part linking the current collector tab junctional part to the lid junctional part;
a safety valve equipped on the lid;
wherein the electrode group is accommodated in the container such that a surface of the electrode group from which the plurality of current collector tabs extend faces toward the lid,
the lead is bent along a first side separating the vibration absorber part from the lid junctional part and a second side separating the vibration absorber part from the current collector tab junctional part, a direction along the first side and a direction along the second side crossing perpendicularly to one another, and has a gap between the lid junctional part and the current collector tab junctional part, and
wherein the lead is made of a single plate.

2. The battery according to claim 1,
wherein the lead comprises a second vibration absorber part lying adjacent to the second side, and satisfies the following formula (2):

$$0.5 < X2/Y2 < 1 \qquad (2)$$

wherein X2 is a length of the second vibration absorber part in an extending direction of the current collector tab, and Y2 is a length of the current collector tab junctional part in the extending direction of the current collector tab.

3. The battery according to claim 1, further comprising a middle lead being located between the current collector tab junctional part of the lead and the current collector tab.

4. The battery according to claim 1,
wherein the current collector tab is joined to the current collector tab junctional part of the lead by ultrasonic joining.

* * * * *